No. 675,592. Patented June 4, 1901.
B. F. ERWAY.
CULTIVATOR.
(Application filed Mar. 9, 1901.)
(No Model.)
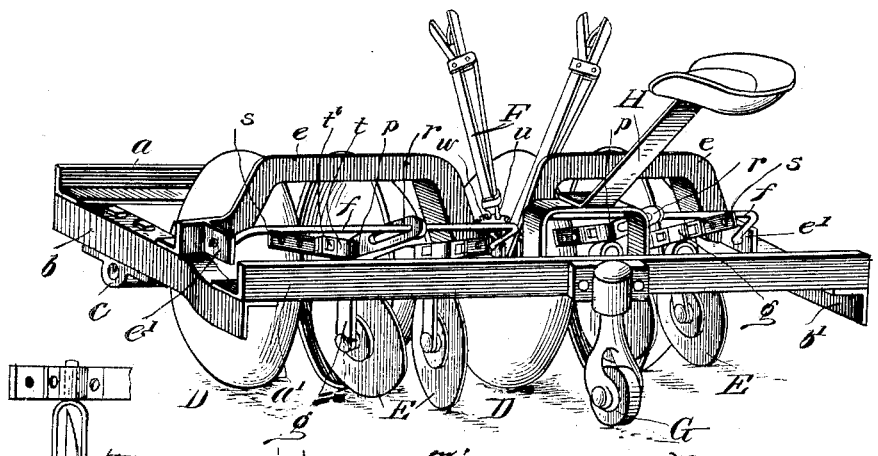
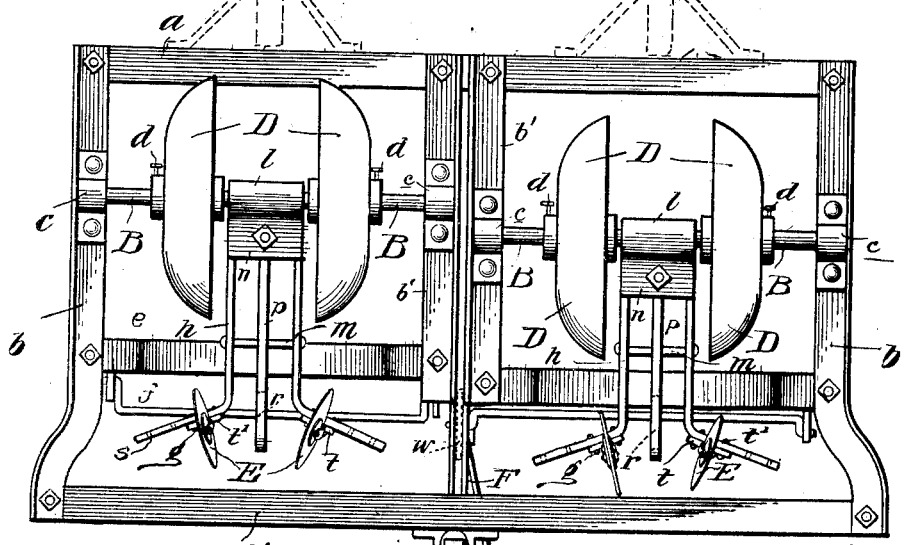
Witnesses
Inventor
Benjamin F. Erway
By P. Walter Fowler
Attorney

UNITED STATES PATENT OFFICE.

BENJAMAN F. ERWAY, OF RODNEY, IOWA.

CULTIVATOR.

SPECIFICATION forming part of Letters Patent No. 675,592, dated June 4, 1901.

Application filed March 9, 1901. Serial No. 50,440. (No model.)

*To all whom it may concern:*

Be it known that I, BENJAMAN F. ERWAY, a citizen of the United States, residing at Rodney, in the county of Monona and State of Iowa, have invented new and useful Improvements in Cultivators, of which the following is a specification.

My invention relates to certain new and useful improvements in rotary cultivators; and it consists of the parts and the constructions and combinations of parts which I will hereinafter describe and claim.

In the accompanying drawings, forming part of this specification, and in which similar letters of reference indicate corresponding parts, Figure 1 represents a rear perspective view of a two-gang rotary cultivator embodying my invention. Fig. 2 is a bottom plan view of the same. Fig. 3 is a detail of one of the disks E, of modified form.

In carrying out my invention I construct a substantially rectangular frame A, of suitable material—say angle-iron, because of its lightness and strength—said frame including front and rear bars $a\ a'$ and connecting end bars $b$, other bars $b'$ being arranged at or about the center of the frame and connecting with the front and rear bars, as shown in Fig. 2.

To the under sides of the end bars $b$ and intermediate bars $b'$ are bolted or otherwise secured or formed boxes or bearings $c$, in which the journal ends of the axles or line-shafts B are rotatively mounted, each of these shafts being independent of the other and one shaft preferably set in advance of the other for the more effective assembling and operation of their cultivator rollers or disks and making it comparatively easy to detach one shaft and its disks without disturbing the other. Upon the axles or line-shafts I place the cultivator rollers or disks D. These may be made of pressed steel or iron and are formed with hubs adapted to receive screws $d$ for securely fixing the disks to the axle so that they rotate therewith. The disks are cup-shaped, and their convex portions are presented outwardly, their open or concaved sides being presented toward each other. Their position with respect to each other may be regulated when desired by loosening the screws $d$ and sliding the disks along the shafts. Back of the disks and connecting each end bar $b$ with the opposite intermediate bar $b'$ I arrange the arched bars $e$, also preferably made of angle-iron, the end portions of said bars $e$ being provided with bearings $e'$, in which the ends of the crank-shafts $f$ are journaled, and which crank-shafts, in connection with an operating lever mechanism hereinafter described, serve to raise and lower another series of disks located in rear of the disks D. These supplemental disks E may be plain substantially straight face disks or slightly concaved with approximately sharp edges, and they are rotatively mounted between the forks of standards $g$, and their shanks are so mounted that an angular adjustment of the disks with relation to the line of travel of the machine is readily accomplished, as I will presently indicate.

The cultivating-disks E are carried by a light framework including parallel longitudinal bars $h$ and a sleeve $l$, through which passes the main axle or line-shaft, whereby said framework is hingedly mounted upon said axle, so that the latter forms the axis about which the disks E are raised and lowered to regulate the depth their edges penetrate the ground and to raise one or both gangs entirely clear of the ground, as when leaving or going on the field. The forward portions of the bars $h$ are connected and braced and held against spreading by means of rods or bolts $m$, and between these bars and secured to a rear plate extension $n$ of each sleeve $l$ is a longitudinal bar $p$, the rear end of which is provided with an elongated slot $r$, through which passes the crank-shaft of that gang.

Each gang includes the devices just described, and each gang and its raising and lowering mechanism is complete in itself, and one gang may be used either singly or with its companion.

The rear ends of the longitudinal bars $h$ are turned away from each other, and these outturned portions are provided with holes $s$, which, in connection with clamping-plates $t$ and bolts $t'$ and nuts, secure the shanks of the cultivator-disks and permit the disks to be adjusted to increase or decrease the distance between them as may be desired or found necessary to meet different conditions or for different distances between furrows.

The angle of the disks E may also be varied by loosening the bolts and turning the shanks and then fixedly clamping them in their new position of adjustment.

The gangs are raised and lowered by means of the aforesaid crank-shafts $f$, engaging the slotted bars $p$, and suitable levers F, fixed to the inner ends of the crank-shafts and provided with pawls $u$, engaging curved racks or segments $w$, fixed to the intermediate bars $b'$ of the main frame.

At the rear of the machine is a swivel-wheel G, which steadies the machine and facilitates its turning or changing the line of travel, and rising from the central portion of the main frame is a seat-standard H, of any well-known type, designed to support a seat in a position sufficiently proximate to the operating mechanisms that the driver may control either or both gangs of disks without difficulty.

The machine may be drawn by any arrangement of draft appliances. In Fig. 2 I show provision for the attachment of a team of three horses, there being two tongues I, one extending from the central line of each gang.

The machine herein described is light, strong, and effective in operation, and the operating parts which come in contact with the ground do so with a rolling action solely, there being no dragging action whatever. The adjustments, vertical and angular, of the disks are obtained without difficulty, and the machine combines, practically, two single-gang machines with controlling mechanisms which place each gang within the control of one operator, thereby enabling him to operate any or all the mechanisms without leaving his seat. I also find the draft is much lighter than in any other two-row cultivator within my experience.

Having thus described my invention, what I claim as new, and desire to secure by Letters Patent, is—

1. In a cultivator, the combination of a main frame, independent axles or shafts mounted in said frame and each provided with a pair of cup-shaped disks, gangs of cultivator-disks, one gang for each pair of cup-shaped disks, a sleeve upon each axle between adjacent disks and arms extending rearwardly between each pair of disks, a cultivator-disk mounted in each of said arms in rear of the first-named disks, and means for raising and lowering the disks of each gang.

2. In a cultivator, the combination of a main frame; independent axles or shafts mounted therein; cup-shaped disks upon said axles or shafts; a sleeve on each axle between the adjacent disks and arms extending rearwardly therefrom said arms having their rear ends bent in opposite directions; a pair of cultivator-disks in rear of the first-named disks; means for adjustably securing each of the rear disks to one of said arms; and means for raising and lowering the rear disks.

3. In a cultivator, the combination of a main frame including front and rear bars; connecting end bars, and other bars intermediate and parallel with the end bars, said intermediate bars disposed proximate to each other in the central plane of the frame and independent arched bars intermediate and substantially parallel with the front and rear bars; independent axles or shafts and boxes or bearings on each of the end and intermediate bars, in which the shafts are independently journaled; disks fixed to said shafts; gangs of disks in rear of the first-named disks and means loosely suspending them from points on the axles between the first-named disks; and means for independently raising and lowering the gang of disks.

4. In a cultivator, the combination of a frame; independent axles or line-shafts with disks thereon; a sleeve loose on each axle and parallel arms extending rearwardly therefrom, and having their rear portions turned away from each other, and provided with holes; forked standards having stems; clamping-plates adjustably securing said stems; disks mounted within the forks of the standards; and means for raising and lowering the last-named disks and their supporting members.

5. A cultivator including a main frame; independent rotatable axles or line-shafts provided with cup-shaped disks; independent gangs of disks and independent means for raising and lowering them; draft appliances at the front of the frame; and a steering or caster wheel centrally located at the rear of the frame.

In testimony whereof I have hereunto set my hand in presence of two subscribing witnesses.

BENJAMAN F. ERWAY.

Witnesses:
C. V. RIDDER,
W. H. EDGAR.